(12) United States Patent
Tsai et al.

(10) Patent No.: US 8,978,050 B2
(45) Date of Patent: Mar. 10, 2015

(54) PROGRAM CALLING METHOD, AND MOBILE DEVICE

(71) Applicants: Irene Tsai, New Taipei (TW); Yi-Fen Chou, Keelung (TW)

(72) Inventors: Irene Tsai, New Taipei (TW); Yi-Fen Chou, Keelung (TW)

( * ) Notice: Subject to any disclaimer, the term of this patent is extended or adjusted under 35 U.S.C. 154(b) by 0 days.

(21) Appl. No.: 13/896,844

(22) Filed: May 17, 2013

(65) Prior Publication Data

US 2013/0312014 A1 Nov. 21, 2013

(30) Foreign Application Priority Data

May 21, 2012 (TW) .............................. 101118036 A

(51) Int. Cl.
*G06F 9/44* (2006.01)
*G06F 9/455* (2006.01)

(52) U.S. Cl.
CPC .............. *G06F 9/44* (2013.01); *G06F 9/45529* (2013.01)
USPC .............................................. 719/320; 718/1

(58) Field of Classification Search
CPC . H04L 67/02; H04L 2209/80; H04L 63/0272; H04L 41/0253; G06F 8/24; G06F 9/45529
See application file for complete search history.

(56) References Cited

U.S. PATENT DOCUMENTS

| | | | | |
|---|---|---|---|---|
| 5,987,523 | A * | 11/1999 | Hind et al. ..................... | 709/245 |
| 8,196,131 | B1 * | 6/2012 | von Behren et al. .......... | 717/168 |
| 2004/0039802 | A1 * | 2/2004 | Stringham ..................... | 709/222 |
| 2010/0210301 | A1 * | 8/2010 | Dietz et al. ................. | 455/556.1 |
| 2012/0207290 | A1 * | 8/2012 | Moyers et al. ............. | 379/90.01 |
| 2013/0103746 | A1 * | 4/2013 | Marcinkowski .............. | 709/203 |

\* cited by examiner

*Primary Examiner* — Tuan Dao
(74) *Attorney, Agent, or Firm* — Nixon & Vanderhye PC

(57) ABSTRACT

A program calling method is to be implemented by a control module, which uses a first channel during execution of a first Java applet, and includes creating a virtual channel that corresponds to a second channel when the first Java applet intends to call a second Java applet which is to be executed using the second channel, in response to a channel management instruction associated with the virtual channel, opening the second channel for allowing execution of the second Java applet, determining whether the virtual channel is still open, and receiving an output from the second Java applet for use by the first Java applet when it is determined that the virtual channel is still open.

18 Claims, 3 Drawing Sheets

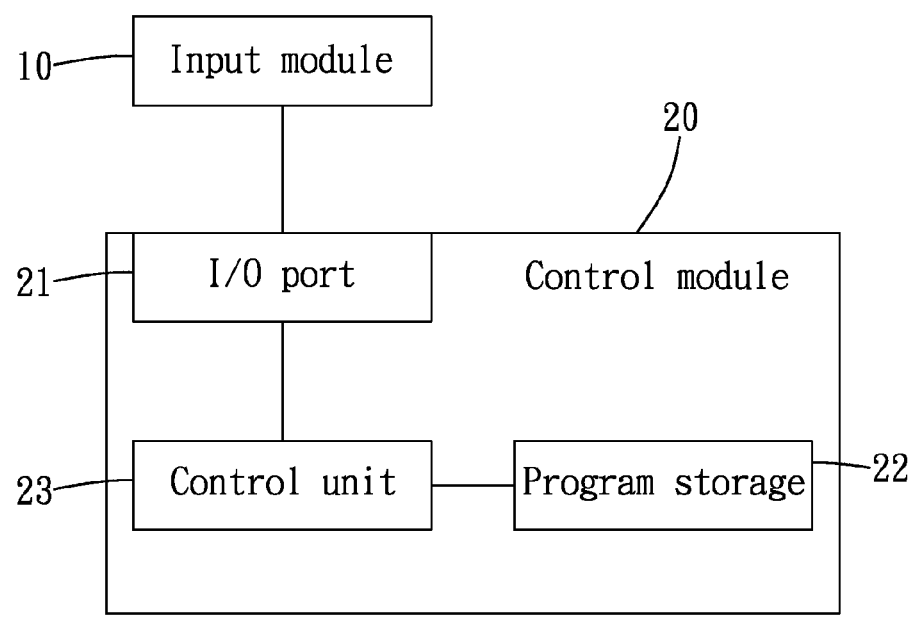
F I G. 1

PROGRAM CALLING METHOD, AND MOBILE DEVICE

CROSS-REFERENCE TO RELATED APPLICATION

This application claims priority of Taiwanese Patent Application No. 101118036, filed on May 21, 2012.

BACKGROUND OF THE INVENTION

1. Field of the Invention

The invention relates to a program calling method, more particularly to a Java applet calling method which is applicable to a Java card virtual machine structure.

2. Description of the Related Art

As applications on a mobile terminal device have developed to have more variety, and as complexity in the aspect of business continues to increase, services provided on the mobile terminal device have become more diverse.

Conventional personal service certification identity terminals, such as subscriber identity module (SIM) cards, identification (ID) cards, bank cards, etc., all belong to a Java card operating system (COS) smart card which conforms with the Java card and Java SIM structure and which has a single input/output (I/O) port interface. These smart cards are categorized as a passive element, and are to be called by the mobile terminal device through protocols. Therefore, if one Java applet of a smart card is desired to be executed in another Java applet, which is running on a Java card virtual machine in the same smart card, a shareable interface object (SIO) is required to be practiced. In other words, calling of a Java applet is currently executed through an instruction invocation by the mobile terminal device or an external card reader device. If it is desired to execute calling between Java applets, the current regulations associated with a Java applet should be modified. However, since the current Java card and Java SIM structure have been practiced for decades, and more than hundreds of millions of the smart cards have been issued to the market, it is impossible to modify the regulations. Moreover, the practice of the SIO interface also incurs security concerns. In addition, current application regulations, which are associated with security of bank cards, published by many international organizations do not include the invocation regulations designed in the SIO, let alone calling between Java applets.

Accordingly, how to perform calling between Java applets under the premise of not modifying the current Java applet regulations is the focus of the present invention.

SUMMARY OF THE INVENTION

Therefore, an object of the present invention is to provide a program calling method capable of performing communication and calling between Java applets.

Accordingly, a program calling method of the present invention is to be implemented by a control module, which stores a plurality of Java applets and which uses a first one of a plurality of channels during execution of a first one of the Java applets. The program calling method comprises:

(A) configuring the control module to create a virtual channel that corresponds to a second one of the channels when the first one of the Java applets intends to call a second one of the Java applets which is to be executed using the second one of the channels;

(B) in response to a channel management instruction associated with the virtual channel, configuring the control module to open the second one of the channels for allowing execution of the second one of the Java applets;

(C) configuring the control module to determine whether the virtual channel is still open; and (D) configuring the control module to receive an output from the second one of the Java applets for use by the first one of the Java applets when it is determined that the virtual channel is still open.

Another object of the present invention is to provide a mobile device capable of performing the aforementioned program calling method.

Accordingly, the mobile device of the present invention comprises an input module and a control module. The control module includes an input/output port coupled electrically to the input module, a program storage storing a plurality of Java applets, and a control unit coupled electrically to the input/output port and the program storage.

While the control module uses a first one of a plurality of channels during execution of a first one of the Java applets, the control unit is configured to create a virtual channel that corresponds to a second one of the channels when the first one of the Java applets intends to call a second one of the Java applets which is to be executed using the second one of the channels. In response to a channel management instruction associated with the virtual channel, the control module is configured to open the second one of the channels for allowing execution of the second one of the Java applets. Subsequently, the control module is configured to determine whether the virtual channel is still open. Finally, the control module is configured to receive an output from the second one of the Java applets for use by the first one of the Java applets when it is determined that the virtual channel is still open.

By virtue of the program calling method of this invention, communication between Java applets may be practiced without modifying the current Java applet regulations. It is noted that the Java applets may be earlier released bank Java applets, such as bank Java applets complying with Europay, MasterCard and Visa (EMV) standards or People's Bank of China (PBOC) standards.

BRIEF DESCRIPTION OF THE DRAWINGS

Other features and advantages of the present invention will become apparent in the following detailed description of a preferred embodiment with reference to the accompanying drawings, of which:

FIG. 1 is a block diagram of a mobile device according to the present invention;

DETAILED DESCRIPTION OF THE PREFERRED EMBODIMENT

Figure 2:
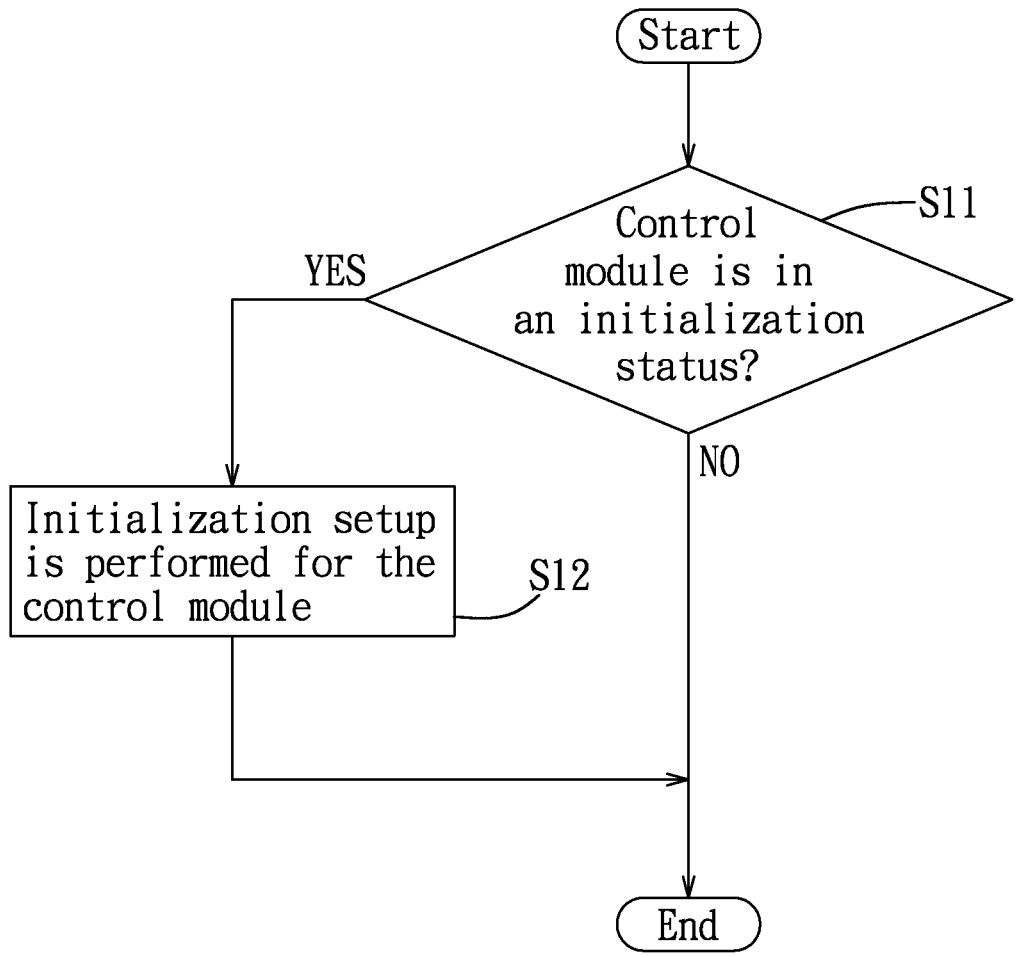
FIG. 2 is a flow chart illustrating an initialization setup procedure that is executed on the mobile device before leaving the factory.

Referring to FIG. 1, a preferred embodiment of a mobile device 100 according to the present invention is illustrated. The mobile device 100, such as a mobile phone, a personal digital assistant (PDA), etc., is a device that is able to communicate with a mobile network through a subscriber identity module (SIM).

In the preferred embodiment, the mobile device 100 comprises an input module 10 and a control module 20.

The input module 10 is a baseband module. Alternatively, the input module 10 may be an input device associated with ISO 7816 (International Organization for Standardization)/ UART (universal asynchronous receiver/transmitter), and is not limited to the preferred embodiment.

The control module 20 is an integrated circuit (IC) application chip which is designed based on a Java card. The control module 20 includes an input/output (I/O) port 21 which is coupled electrically to the input module 10, a program storage 22, and a control unit 23 which is coupled electrically to the I/O port 21 and the program storage 22. The I/O port 21 is configured to communicate with the input module 10 according to the ISO 7816 protocol for transmitting information therebetween. The program storage 22 is provided to store a plurality of Java applets. These Java applets may be obtained by a user who may correspondingly download the Java applets based on the user's needs via over-the-air (OTA) programming. The Java applets may be SIM application toolkit (STK) applets or bank Java applets. The control unit 23 is provided to, according to content of information transmitted from the input module 10, control the I/O port 21 to be electrically connected to the program storage 22 for allowing information to be transmitted therebetween, and control the plurality of Java applets stored in the program storage 22 to communicate with each other.

In the present invention, the control module 20 is established based on a structure of the Java card virtual machine, such that other application programs, such as programs associated with Europay, MasterCard and Visa (EMV), People's Bank of China (PBOC), certificate authority (CA), public key infrastructure (PKI), etc., which comply with the Java card standard regulations may be transplanted to a Java virtual machine of the control module 20 for execution. Moreover, since the structure of the Java card virtual machine is a structure that supports GlobalPlatform, the control module 20 is capable of OTA updates, is able to update Java applets, and safety certification elements and systems, and therefore is a secure element (SE). It is noted that the control module 20 may be manufactured in the input module 10 and integrated with the input module 10 on the same chip, and in the alternative may be manufactured independently as a single chip, and should not be limited to the kind of manufacturing method.

Referring to FIG. 1 and FIG. 2, since the control module 20 is an IC application chip designed based on a Java card, the control module 20 of each mobile device 100 needs to undergo initialization setup in the production chain before leaving the factory. In step S11, a factory operator may utilize a card reader or initialization equipment to determine whether the control module 20 is in an initialization status. When it is determined in step S11 that the control module 20 is in the initialization status, this means that the control module 20 is a card required to be initialized, and thus step S12 is performed. In step S12, the initialization setup is performed for the control module 20. During the initialization setup, software, such as an operation system, a card management program, etc., and personal data associated with a user are loaded into the control module 20. When it is determined in step S11 that the control module 20 is not in the initialization status, this means that the control module 20 has already been configured to be a Java card (or in a Java card status), and thus the control module 20 does not need to undergo the initialization setup.

Figure 3:
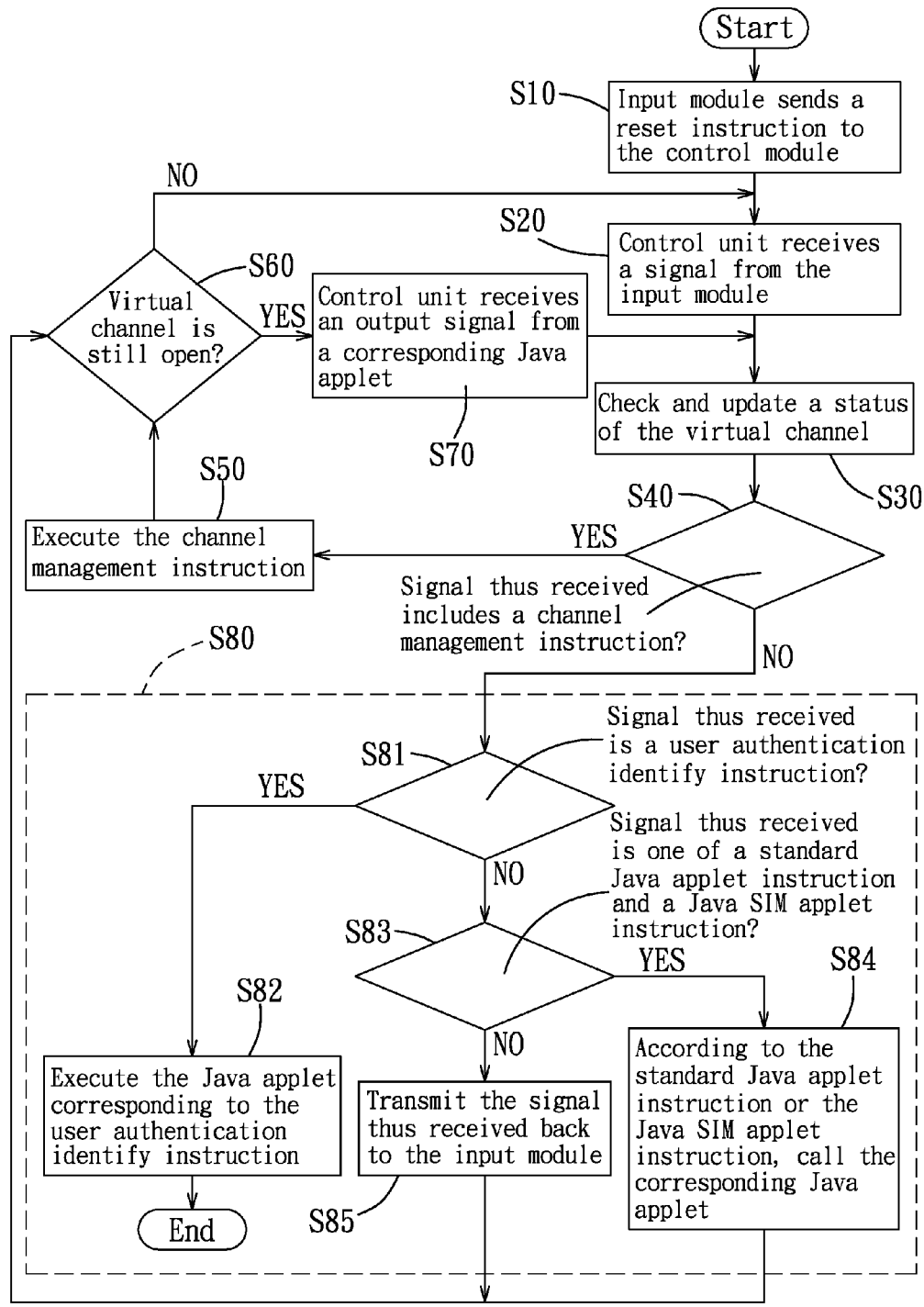
FIG. 3 is a flow chart illustrating a program calling method to be performed by a control module according to the present invention.

Referring further to FIG. 3, detailed procedures to be performed by the control module 20 during operation are described hereinafter.

In step S10, when the user turns on or actively resets the mobile device 100, the input module 10 is configured to send a reset instruction to the control module 20 if the control unit 23 is required to be reset.

In step S20, the control unit 23 is configured to receive a signal transmitted from the input module 10 via the I/O port 21.

In step S30, under a condition that the control unit 23 uses a first one of a plurality of channels during execution of a first one of the Java applets, the control unit 23 is configured to create a virtual channel that corresponds to a second one of the channels when the first one of the Java applets intends to call a second one of the Java applets which is to be executed using the second one of the channels. In this embodiment, the control module 20 is configured to provide a flag for each one of the channels and the virtual channel, which corresponds to one of the channels, in the control module 20. The control unit 23 is configured to check and update a status of the virtual channel. Specifically, the control unit 23 is configured to register the flag of the virtual channel, i.e., to register the flag of said one of the channels that corresponds to the virtual channel, when creating the virtual channel. Furthermore, the control unit 23 may be configured to modify/update the flag of said one of the channels that corresponds to the virtual channel according to the signal received in step S20 (or step S70, which will be described in detail hereinafter). More specifically, the control unit 23 is configured to determine whether the signal received in step S20 (or step S70) includes a channel setting instruction, such as Create Channel, Close Channel, an instruction for indicating whether the second one of the Java applets is still being called by the first one of the Java applets, etc., and to create or close a corresponding virtual channel when it is determined that the signal includes the channel setting instruction. For example, the control unit 23 creates the virtual channel which corresponds to the second one of the channels by registering the flag of the virtual channel (i.e., the flag of the second one of the channels). When it is determined in step S30 that the signal does not include the channel setting instruction which is adapted for creating, closing the virtual channel, or for modifying a status of the virtual channel, the flow proceeds to step S40.

It is noted that step S30 is not a standard virtual machine/ Java Card Runtime Environment (JCRE) modular block in the control unit 23, and JCRE native kernel architecture therein is modified for implementing step S30.

In step S40, the control unit 23 is configured to determine whether the signal received in step S20 (or step S70) includes a channel management instruction. The channel management instruction includes a plurality of channel settings. Each of the channel settings corresponds to a designated one of the Java applets stored in the program storage 22. When it is determined that the signal includes the channel management instruction, the flow proceeds to step S50. Otherwise, the flow proceeds to step S80. Step S40 is a standard virtual machine/ JCRE modular block in the control unit 23.

In step S50, in response to a channel management instruction associated with the virtual channel, the control unit 23 is configured to open the second one of the channels for allowing execution of the second one of the Java applets. In other words, the control unit 23 is configured to execute the channel management instruction, that is, to update states (e.g., ON and OFF) of the channels according to the channel management instruction. Specifically, the control unit 23 may set a specific one of the channels ON and set the rest of the channels OFF (or Stop/Freeze), and stores information of the channel which is set OFF under usage in a memory buffer. Alternatively, the control unit 23 may set many ones of the channels ON. In the preferred embodiment, the control unit 23 is configured to set the second one of the channels that corresponds to the virtual channel created in step S30 ON, for allowing the first one of the Java applets (i.e., a current channel) to communicate with the second one of the Java applets which corresponds to the virtual channel (i.e., the second one of the channels). Step S50 is a standard virtual machine/JCRE modular block in the control unit 23. However, in other embodiment, step S50 may be also modified to check or update the status of the virtual channel.

In step S60, the control unit 23 is configured to determine whether the virtual channel, i.e., the second one of the channels opened in step S50, is still open. In this embodiment, the virtual channel is determined to be still open when the control unit 23 determines that said one of the channels that corresponds to the virtual channel opened in step S50 (i.e., the second one of the channels) is being called by another Java applet (i.e., the first one of the Java applets). More specifically, the control unit 23 is configured to determine whether the second one of the Java applets is being called by the first one of the Java applets from a registration state of the flag of the virtual channel. Alternatively, the virtual channel is determined to be still open when the control unit 23 determines that a return instruction returning to the input module 10 belongs to one of a return instruction resulting from opening the second one of the channels and a return instruction associated with the output from the second one of the Java applets. In addition, the control unit 23 is further configured to check or update the status of the virtual channel. When it is determined in step S60 that the virtual channel is still open, the flow proceeds to step S70. Otherwise, when it is determined in step S60 that the virtual channel is not open, the flow proceeds to step S20. It is noted that the first one of the Java applets which calls the second one of the Java applets and results in opening the virtual channel may also close the virtual channel by once again calling a channel instruction for closing the virtual channel.

It is noted that step S60 is not a standard virtual machine/JCRE modular block in the control unit 23, and the JCRE native kernel architecture therein is modified for implementing step S60.

In step S70, the control unit 23 is configured to receive an output signal from the second one of the Java applets which corresponds to the virtual channel for use by the first one of the Java applets. The control unit 23 is further configured to provide a signal which is associated with at least one of the channel setting instruction and the channel management instruction for modifying the flag of the virtual channel and for modifying a relationship between the virtual channel and a corresponding one of the channels. Subsequently, the flow proceeds to step S30. It is noted that step S70 is not a standard virtual machine/JCRE modular block in the control unit 23, and the JCRE native kernel architecture therein is modified for implementing step S70.

In step S80, the control unit 23 is configured to perform a corresponding process according to a type of the signal received in step S20. In this embodiment, step S80 may include the following sub-steps.

In step S81, the control unit 23 is configured to determine whether the signal received in step S20 is a user authentication identify instruction (e.g., SIM/USIM (universal SIM) applet). When it is determined that the signal is the user authentication identify instruction, this means that the signal is a Global System for Mobile Communications (GSM) instruction, and the flow proceeds to step S82. Otherwise, the flow proceeds to step S83. Step S81 is a standard Java SIM/virtual machine/JCRE modular block in the control unit 23.

In step S82, in response to the user authentication identify instruction, the control unit 23 is configured to execute one of the Java applets which corresponds to the user authentication identify instruction. Step S82 is a standard Java SIM/virtual machine/JCRE modular block in the control unit 23.

In step S83, the control unit 23 is configured to determine whether the signal received in step S20 is one of a standard Java applet instruction and a Java SIM applet instruction. When it is determined that the signal is one of the standard Java applet instruction and the Java SIM applet instruction, the flow proceeds to step S84. When it is determined that the signal is neither one of the standard Java applet instruction nor the Java SIM applet instruction, the signal is presumed to be one of a Java Card Runtime Environment (JCRE) instruction and a test instruction, and then the flow proceeds to step S85. Step S83 is a standard Java SIM/virtual machine/JCRE modular block in the control unit 23.

In step 84, in response to the standard Java applet instruction or the Java SIM applet instruction, the control unit 23 is configured to call, according to the standard Java applet instruction or the Java SIM applet instruction, one of the Java applets which corresponds to the standard Java applet instruction or the Java SIM applet instruction through a special virtual channel command format, such that the first one of the Java applets (the current applet) may communicate with, for example, the second one of the Java applets thus called for allowing transmission of information therebetween. Subsequently, the flow proceeds to step S60. It is noted that the special virtual channel command format is previously written in the control module 20 and corresponds to a standard channel command format utilized to call one of the Java applets from the input module 10. Step S84 is a standard Java SIM/virtual machine/JCRE modular block in the control unit 23, and a new library is added to control management of the virtual channel and to allow the first one of the Java applets to call the second one of the Java applets using the virtual channel.

In step S85, the control unit 23 is configured to transmit the signal received in step S20 back to the input module 10. It is noted that each signal to be transmitted back to the input module 10 will go through the determination of step S60, so as to determine whether the signal belongs to information communicated between the Java applets or belongs to information communicated between the Java applet and the input module 10. Certainly, in combination with different setups, the control unit 23 may also pass the signal received in step S20 to a specific JCRE circuitry for execution. Alternatively, the control unit 23 may call, via a specific Java applet instruction, a specific program to invoke a specific service instruction and signal flows of the specific program, and therefore the practice of the control unit 23 is not limited to the preferred embodiment.

It is evident from the aforementioned steps S10 to step S80 that the mobile device 100 of the present invention may realize a safety certification element that supports channel calling and that conforms to a structure suitable for operation of the Java virtual machine. During the process of the operation, a mechanism of channel management is entirely managed by the control unit 23 according to the channel management instruction of the signal. Moreover, the corresponding process performed in step S80 also complies with the structure of the Java card virtual machine, and is to invoke a library and a memory in a corresponding native layer according to an application programming interface (API), an object, etc. in the virtual channel. In addition, when the Java applet invokes the API, the Java applet may first call the Create Channel instruction, set the virtual channel ON, and call the Close Channel instruction after invocation, so as to release the occupied virtual channel. In this way, the service instruction of the input module 10 may be assured to operate normally.

The steps of S20, S50 and S80 are all standard virtual machine/JCRE blocks. In the present invention, the standard Java virtual machine architecture is changed, and the interface architecture between the I/O port 21 and the control unit 23 is modified, so as to implement the aforementioned steps of S30, S40 and S70 (i.e., kernel blocks) associated with the instruction routing flow and rule.

Furthermore, the program (Java applet) calling method is not only applicable to the mobile device 100 with the single I/O port 21. For a structure of the Java card virtual machine having multiple I/O ports, an effect of communication between Java applets may also be achieved by means of the program calling method of the present invention.

To sum up, the mobile device 100 of the present invention, by virtue of the control module 20, conforms to the structure of the Java card virtual machine. Moreover, by adding the Create Channel instruction and the Close channel instruction, which are utilized to set the virtual channel, to the API of the control unit 23, and by allowing a current one of the Java applets to invoke the service instruction associated with outgoing data and to send the outgoing data to the Java applet that corresponds to the virtual channel, the Java Applets may communicate with each other and information may be transmitted therebetween.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A program calling method to be implemented by a control module, which stores a plurality of Java applets and which uses a first one of a plurality of channels during execution of a first one of the Java applets, the program calling method comprising:
   (A) configuring the control module to create a virtual channel that corresponds to a second one of the channels when the first one of the Java applets intends to call a second one of the Java applets which is to be executed using the second one of the channels, the Java applets complying with Java card standard regulations, and the control module being established based on a structure of a Java card virtual machine;
   (B) in response to a channel management instruction associated with the virtual channel and associated with the Java Card Runtime Environment (JCRE), configuring the control module to open the second one of the channels for allowing execution of the second one of the Java applets;
   (C) configuring the control module to determine whether the virtual channel is still open; and
   (D) configuring the control module to receive an output from the second one of the Java applets for use by the first one of the Java applets when it is determined that the virtual channel is still open.

2. The program calling method as claimed in claim 1, wherein, in (C), the virtual channel is determined to be still open when the control module determines that the second one of the Java applets is being called by the first one of the Java applets.

3. The program calling method as claimed in claim 2,
   wherein, in (A), the control module is configured provide a flag for the virtual channel in the control module and to register the flag of the virtual channel when creating the virtual channel; and
   wherein, in (C), the control module is configured to determine whether the second one of the Java applets is being called by the first one of the Java applets from a registration state of the flag of the virtual channel.

4. The program calling method as claimed in claim 1, wherein, in (C), the virtual channel is determined to be still open when the control module determines that a return instruction belongs to one of a return instruction resulting from opening the second one of the channels and a return instruction associated with the output from the second one of the Java applets.

5. The program calling method as claimed in claim 1, wherein, in (A), the control module is configured to provide a flag for the virtual channel in the control module and to register the flag of the virtual channel when creating the virtual channel.

6. The program calling method as claimed in claim 1, wherein, in (B), during a period when the second one of the channels is open, a flag of the virtual channel, which is provided in the control module, is registered.

7. The program calling method as claimed in claim 1, further comprising:
   (F-1) in response to a user authentication identify instruction, configuring the control module to execute one of the Java applets which corresponds to the user authentication identify instruction; and
   (F-2) in response to a standard Java applet instruction, configuring the control module to call, according to the standard Java applet instruction, one of the Java applets which corresponds to the standard Java applet instruction.

8. The program calling method as claimed in claim 7, wherein the control module is coupled to an input module, and wherein, in (F-2), the control module calls said one of the Java applets through a virtual channel command format which is previously written in the control module and which corresponds to a standard channel command format utilized to call one of the Java applets from the input module.

9. The program calling method as claimed in claim 1, wherein the control module is coupled to an input module, the program calling method, prior to (A), further comprising:
   configuring the control module to reset upon receipt of a reset instruction from the input module.

10. A mobile device comprising:
   an input module; and
   a control module which is established based on a structure of a Java card virtual machine, and which includes:
      an input/output port coupled electrically to said input module,
      a program storage storing a plurality of Java applets complying with Java card standard regulations, and
      a control unit coupled electrically to said input/output port and said program storage;
   wherein under a condition that said control module uses a first one of a plurality of channels during execution of a first one of the Java applets, said control unit is configured to:
      create a virtual channel that corresponds to a second one of the channels when the first one of the Java applets intends to call a second one of the Java applets which is to be executed using the second one of the channels,
      in response to a channel management instruction associated with the virtual channel and associated with the Java Card Runtime Environment (JCRE), open the second one of the channels for allowing execution of the second one of the Java applets, determine whether the virtual channel is still open, and receive an output from the second one of the Java applets for use by the first one of the Java applets when it is determined that the virtual channel is still open.

11. The mobile device as claimed in claim 10, wherein the virtual channel is determined to be still open when said control module determines that the second one of the Java applets is being called by the first one of the Java applets.

12. The mobile device as claimed in claim 11, wherein said control module is configured to provide a flag for the virtual channel in the control module and to register the flag of the virtual channel when creating the virtual channel; and wherein said control module is configured to determine whether the second one of the Java applets is being called by the first one of the Java applets from a registration state of the flag of the virtual channel.

13. The mobile device as claimed in claim 10, wherein the virtual channel is determined to be still open when said control module determines that a return instruction belongs to one of a return instruction resulting from opening the second one of the channels and a return instruction associated with the output from the second one of the Java applets.

14. The mobile device as claimed in claim 10, wherein said control module is configured to provide a flag for the virtual channel in said control module and to register the flag of the virtual channel when creating the virtual channel.

15. The mobile device as claimed in claim 10, wherein, during a period when the second one of the channels is open, a flag of the virtual channel, which is provided in said control module, is registered.

16. The mobile device as claimed in claim 10, wherein, in response to a user authentication identify instruction, said control module is configured to execute one of the Java applets which corresponds to the user authentication identify instruction; and in response to a standard Java applet instruction, said control module is configured to call, according to the standard Java applet instruction, one of the Java applets which corresponds to the standard Java applet instruction.

17. The mobile device as claimed in claim 16, wherein the control module calls said one of the Java applets through a virtual channel command format which is previously written in the control module and which corresponds to a standard channel command format utilized to call one of the Java applets from said input module.

18. The mobile device as claimed in claim 10, wherein said input module is a baseband module.

* * * * *